PIEZOELECTRIC ASSEMBLY

Filed Sept. 14, 1961

INVENTORS
WINFIELD JAMES TROTT
WILLIAM E. RADFORD

BY Richard C. Reed

ATTORNEY 3,179,826

PIEZOELECTRIC ASSEMBLY

Winfield James Trott and William E. Radford, Orlando, Fla., assignors to the United States of America as represented by the Secretary of the Navy Filed Sept. 14, 1961, Ser. No. 138,204
4 Claims. (Cl. 310—8.2)
(Granted under Title 35, U.S. Code (1952), sec. 266)

The invention described herein may be manufactured and used by or for the Government of the United States of America for governmental purposes without the payment of any royalties thereon or therefor.

This invention relates to an improved piezoelectric assembly of the type having a plurality of thin electromechanically responsive elements assembled face to face. The invention is also concerned with the art of joining metallic and non-metallic objects which are adversely affected by bonding techniques employing high temperatures and pressures.

Piezoelectric assemblies are formed by stacking or joining together a plurality of electromechanically responsive crystalline or ceramic elements with metal foils and electrodes interposed between the individual elements. Organic chemical compounds have often been employed in binding piezoelectric elements and their electrodes into a composite assembly, however, organic adhesives, such as the epoxy base cements, do not have high elastic moduli nor sufficiently high electrical conductivity. Furthermore, many commonly employed adhesives require relatively high curing temperatures that have a harmful effect on most crystalline and ceramic type compositions.

It will be appreciated by those skilled in the art that the ideal joint between vibrating piezoelectric elements in an electroacoustic device has infinite stiffness in the direction of the applied force, as well as negligible mass and mechanical losses. Metals, as a general class of materials, are stiffer and have lower mechanical losses than the organic compounds that are commonly used as adhesives. most available metallic solders, however, fail to meet the requirements for a low solidus temperature along with satisfactory workability and mechanical properties.

Amalgams have been utilized in the past for joining together metallic surfaces, but the previous methods have employed temperatures and pressures that can destroy such desirable properties as, the piezoelectric effect, crystal structure, hardness, form, etc. In addition, articles that are joined at relatively high temperatures usually require expensive tools and apparatus for manipulating and treating them during the bonding process.

It has now been discovered that piezoelectric elements of the type hereinbefore mentioned may be effectively joined together by means of fluid amalgams, and in some instances equally effective results may be obtained by the application of pure mercury on the surfaces to be joined, forming between said elements rigid, metallic bonds at curing temperatures below 100° C. This method of forming metallic bonds is especially advantageous in transducer designs in which electroded piezoelectric elements are joined to similar material without subjecting them to injurious temperatures.

Therefore, it is an object of the present invention to provide a novel piezoelectric assembly having improved performance characteristics and being considerably more useful for compressional wave senders and receivers.

A further object of the invention is to provide a novel bonding means between piezoelectric elements in which the bond is characterized by high elastic moduli, high tensile strength, low mechanical losses and high electrical conductivity.

It is also an object of the present invention to provide an improved electroacoustic transducer that utilizes a novel piezoelectric assembly having the desired effect of increasing the electromechanical properties of the transducer.

An addiitonal object is to unite objects that cannot be effectively joined together by welding, brazing, soldering, nor by means of chemical adhesives without destroying desirable physical and chemical properties in said objects.

These and other objects of the invention will appear from the following description when taken in connection with the accompanying drawings, and the scope of the invention will be pointed out in the appended claims.

According to the present invention, an effective metallic bond is formed between suitable metallic surfaces by applying a thin film amalgam composition, preferably one containing silver particles, bringing the surfaces to be joined together and curing the bond between them at a low temperature in the range of about 45 to 90° C. for a time sufficient to form a rigid bond. During the curing step, mercury is absorbed by the surface layers, and some of the surface material is in turn fused or dissolved into the applied amalgam thus forming a continuous alloy across the bonding surfaces. Curing the bond for a sufficient time at a low temperature, as specified herein, results in a solid-state diffusion between the amalgam and the surface material thus obtaining considerable improvement in the physical properties of the bond.

Fluid amalgams according to the present invention consist essentially of solid material suspended in a mercury solution saturated with said material. The workability of a fluid amalgam depends on the weight percentage composition of the solid material and also on the size and shape of the suspended particles therein. Suitable silver amalgams that remain fluid and workable at room temperature have a silver content of about 5–25 percent. Amalgams having a fixed weight percentage of silver will vary in degree of plasticity directly with the particle size.

The duration for which joined parts may be held in the aforementioned temperature range will depend generally on the metal surfaces to be joined, on the particular amalgam composition to be used for this purpose and on the extent of the bonding area. In binding silver surfaces together with a silver amalgam, it has been found advantageous to retain the joined parts at a temperature of about 65° C. for a period of about 48 to 72 hours.

In general, metal particles which are more stable for fluid type amalgams, capable of forming thin bonding films, have a diameter range of nearly 1–12 microns, although larger particles may be used depending upon the porosity of the surfaces. Relatively small particles penetrate the surfaces being joined and act as filling material, however, an excess of relatively small particles will lower the tensile strength of the cured bond. Large particles on the other hand limit the minimum thickness of the bond. A mixture of silver particles averaging about 7 microns in diameter has been found to improve the continuity of the bond.

An important feature of the invention resides in heating the bond sufficiently to effect a solid-state diffusion between the amalgam composition and the surface metal. Low-temperature heating over a sustained period produces migration of surface metal into the amalgam composition thus forming an amalgam bond of high surface-metal content. In a silver amalgam which joins together silver surfaces, additional silver will migrate into the amalgam during the curing process, while some amalgam and excess mercury will diffuse into the silver surfaces and become enriched with silver. Solid-state diffusion of the silver amalgam occurs substantially at temperatures below 127° C., the softening point of silver-mercury compositions, and silver-enriched amalgams produced in this manner provide substantially improved heat resistance and stability to the bond. The curing step of the present invention normally imparts a tensile strength characteristic to the bond, which is demonstrated by actual tensile strength tests to exceed 2000 pounds per square inch.

The objects to be joined must have suitable metallic surfaces, such as, silver, copper, gold, tin and their alloys, and their surfaces should be in close alignment and in ultimate contact throughout their adjoining areas. Crystal, ceramic and metal objects which cannot be bonded directly by means of amalgams may be effectively joined together by initially forming an amalgamatable surface, for example, a thin silver deposit on the surfaces to be joined, and then by applying an amalgam or mercury film on the deposited metal surface, the parts are joined and cured in the manner described herein. Suitable metallic deposits are produced by electroplating, by vacuum metallizing, and by heat treating a metal suspension on the surfaces to be bonded.

Surface metallizing, which is an essential step for joining non-metallic surfaces and such metals as iron or platinum which are not wetted by mercury under ordinary conditions, must provide a surface metal of sufficient thickness depending upon the amalgam composition as well as upon the porosity of the surface. The surface metal must be of sufficient thickness to prevent mercury and amalgam from penetrating to the underlying surface and thus weaken the bond.

The surfaces to be joined should be free of contaminants, and essentially all dust, lint, oxides and other surface impurities should be removed by scrubbing. Clean crystal, ceramic or metal surfaces which are freshly coated with silver or other suitable metallic film need only to be rinsed with cold water to remove acid chemicals and other water-soluble impurities. The clean surfaces are then wetted with a fluid amalgam containing, for example, 95% mercury and 5% silver by weight, by spreading said amalgam over both surfaces to be joined; the wetted surfaces are then pressed together lightly, and with the surfaces thus in contact, the two pieces are rubbed together to expel excess amalgam and entrapped air that may be present. The two pieces are then fixed in the desired relationship, and a slight pressure of about 10 pounds per square inch is applied to the joined parts. The joined parts are then placed in a heat zone and maintained at a constant temperature below 100° C. until they are firmly and permanently united.

In certain cases where the metal surfaces are freshly deposited with surface metal and are very flat, equal results are achieved by substituting pure mercury in place of the fluid amalgams.

The invention as it pertains to the piezoelectric assembly will best be understood by reference to the following description when considered in connection with the accompanying drawings, in which.

Figure 1:
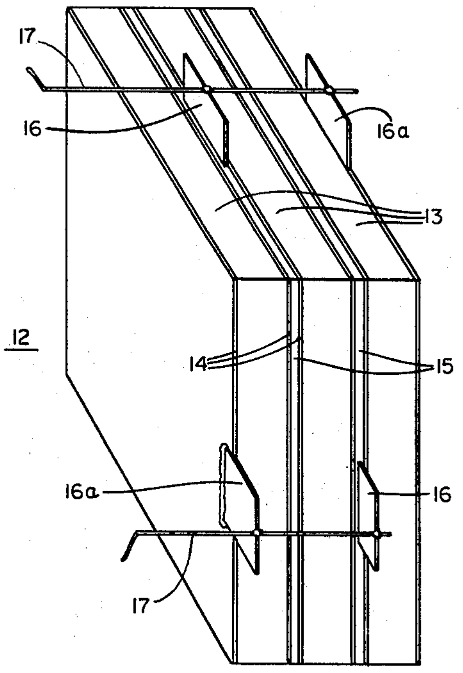
FIG. 1 is a perspective view of a piezoelectric assembly in which electroded crystal elements are joined together by a fluid amalgam in accordance with the invention.

With reference to the drawings, there is shown in FIG. 1, a piezoelectric crystal body 12 in which a plurality of crystal plates 13 are cemented together in face-to-face relationship for the purpose of increasing the electrical capacitance of the piezoelectric body. The crystal plates 13 are cut from any piezoelectric crystalline material, such as Rochelle salt, dibasic ammonium phosphate, lithium phosphate monohydrate, and the like.

The individual plates are electroded by applying to the face surfaces thereof a thin layer of silver, indicated by reference character 14; the silver electrodes are deposited on the crystal surfaces to a thickness of several ten thousands of an inch, for example, a silver deposit having a thickness of about 0.0005 inch. An amalgam layer 15, composed of silver and mercury provides rigid bonding means between the silver-electroded crystal elements. Metal conductors 16, which are inserted during the amalgam formation, become firmly attached therein upon completion of the amalgam bond and provide improved electrical conductive means with said adjoining crystal plates. Terminal conductors 16*a* are soldered to the electrode surface. When the conductors are connected by electrical conductors 17, the crystal body 12 may be used as a transducer motor by applying an alternating voltage to the electrical conductors, and said piezoelectric assembly will vibrate in accordance with the voltage. Alternately, if the piezoelectric crystal assembly is used as a generator device and mechanical stresses are applied to the plates, there will be a voltage generated between the conductors.

Figure 2:
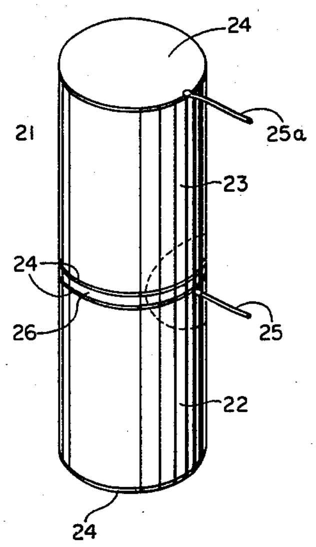
FIG. 2 is a perspective view of an amalgam-joined ceramic rod unit.

In FIG. 2, a piezoelectric ceramic assembly 21 is formed by joining together ceramic rods 22 and 23 composed of barium titanate or other similar piezoelectric substance. Specifically, ceramic rods of ½-inch diameter and 1-inch length are individually electroded on both of their end surfaces by spraying with a suspension of silver powder and then firing at a high temperature to form a continuous silver surface 24 approximately 0.001 inch in thickness. After the electroding operation, the ceramic rods are polarized to obtain the desired piezoelectric effect, as is well known in the art. Wire leads 25 and 25*a* provide electrical connection to the electroded surfaces.

Figure 3:
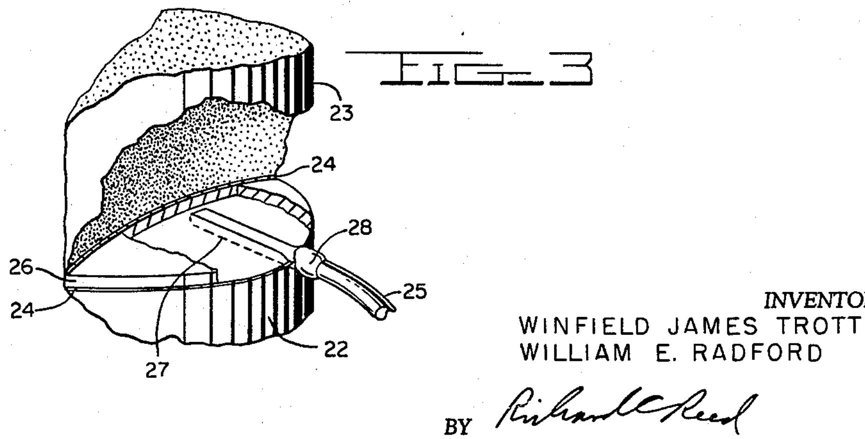
FIG. 3 is an enlargement view of the amalgam joint between the rods in FIG. 2, with one of the rods partly cut away to illustrate the internal structure.

Wire lead 25, which forms the electrical connection within the amalgam joint 26, is made preferably of silver, 0.006 inch in diameter; the wire is fastened in a groove 27 cut in the end of rod 22. The end of the wire is shown in the enlargement view of FIG. 3, embedded in groove 27 which has been cut into the end of the rod to a depth equal to about ⅔ the diameter of said wire. Near the surface of the rod said groove becomes somewhat wider to provide sufficient movement to the wire. A coating of rubber cement 28 is applied to the wire near the end of the groove to provide additional strength to the wire at this point and also to prevent migration of mercury from the groove onto the wire. The surface on rod 22 which retains the embedded wire, is then lapped with the wire in place to form a flat electrode surface.

An 8% silver amalgam was prepared to join the ceramic rods as follows: About 10 grams of mercury was weighed and placed in a glass crucible. Fine silver powder in the quantity necessary to form an amalgam having about 8% silver by weight was added to the mercury in several applications while the mass was continuously stirred with a rod. The prepared amalgam was then placed in a shallow dish, and the surface thereof was brushed lightly with a camel's hair brush until it had a mirror-like appearance. The silver particles in the amalgam composition were fairly uniform in size, averaging about 7 microns in diameter.

One of the ends to be joined was then brought in contact with the clean amalgam surface and immediately withdrawn. The ends of the two rods were pressed together, and the amalgam therein was worked by sliding one surface against the other until a very thin film amalgam remained. Pressure of about 10 pounds per square inch was applied to the joint by means of a small clamp, and the clamped rods were placed in an oven and held at a temperature of 65° C. for about 48 hours. When the curing process was completed, the joined rods were removed from the oven and wrapped in thermal insulation for slow cooling to prevent internal stresses in the ceramic composition.

Current measurements which determine the frequency of the length-mode resonance were conducted on the joined ceramic rods. When the joint between ceramic rods is optimum, the length-mode resonance frequency is one-half that of the individual rods. The rods joined together by means of the silver amalgam, as described above, indicated optimum joint conditions within the limits of measurement. The length-mode resonance frequency of a solid ceramic rod of the same material and having the same dimensions as those of the joined rod assembly was measured at 43.35 kc.; the length-mode resonance frequency of the amalgam-joined rods was 43.37 kc. For comparison purposes, a ceramic assembly of the same material and having the same dimensions, but joined together by means of a rubber cement composition (an electric connection being provided therein by a silver foil, 0.001 inch in thickness) was measured at 39.12 kc.

To test the bonding strength of the low temperature amalgam bond, brass cylinders with a ⅞-inch diameter and a 1-inch length were electroplated with a thin application of copper followed by a silver plating having a thickness of about 0.001 inch. The electroplated silver deposit was applied from a potassium cyanide bath and the surface was finished matte white. The ends of the cylinders to be joined were coated with an 8% silver amalgam; they were pressed together and excess amalgam was removed. The joined cylinders were clamped together with a pressure of about 15 to 20 pounds per square inch and heat-treated in an oven at a temperature of about 65° C. for a period of 72 hours. After removal of the cylinders from the oven, they were allowed to cool slowly. The joined cylinders were then subjected to two hours of boiling water. The cylinders were then vibrated at a frequency of 4 cycles per second for one hour at an amplitude of 3 inches with a 100-gram load attached to one of the joined cylinders and left free of mechanical support. There was no evidence of any adverse effect to the joint.

The joints between ceramic and crystalline surfaces which are electroded and joined together by means of amalgams have high elastic moduli, usually exceeding 1,000,000 p.s.i. They also display tensile strengths of more than 2000 pounds per square inch. The strong bond formed by the present bonding technique will continue, even though the temperature is later raised above the temperature at which the bond was cured.

In joining silver or copper surfaces, a silver amalgam is preferred, since it is more easily prepared, readily formed into a bonding film, does not oxidize and has satisfactory physical properties. A silver amalgam, moreover, may contain other metals to impart beneficial effects to the bond. For example, cadmium, tin, copper, indium and gold may be alloyed with silver to introduce different characteristics to the amalgam bond which are found useful for various applications.

The low-temperature bonding process described herein can be used to produce optimum joints which find application in electroacoustic devices. The joints have sufficient strength and stability, even though they are cured at low temperatures. Moreover, the cured bond of the present invention will not soften if it is later subjected to temperatures considerably higher than the curing temperature.

Although the invention has been described with a certain degree of particularity, it is obvious that many modifications and advantages will be apparent to those skilled in the art, and it should be understood that the appended claims will cover all such modifications and advantages which fall within the spirit and scope of the invention.

What is claimed is:

1. A piezoelectric assembly comprising a plurality of electromechanically responsive elements assembled face to face, said elements having electroded face surfaces and being joined to each other through said surfaces by an amalgam of mercury with silver of approximately the range of 5 to 25 percent of silver by weight, and electrical leads between said elements.

2. A piezoelectric assembly comprising a plurality of piezoelectric elements assembled in an end to end relationship, each of said elements including oppositely disposed flat surfaces, each of said surfaces having an amalgamatable electrode affixed to the entire surface thereof, an amalgam film between adjacent elements bonding together the elements and making an electrical connection between said electrodes on adjacent faces of said piezoelectric elements, and electrical conductors secured between each of said elements by said amalgam film and to the outer face of each of the end piezoelectric elements of said assembly, and a pair of electrical leads electrically connecting alternate electrical conductors with each other.

3. A piezoelectric assembly as claimed in claim 2 wherein said film between adjacent elements of said piezoelectric assembly if of a silver and mercury amalgam.

4. A piezoelectric assembly as claimed in claim 2 wherein said film between adjacent elements of said piezoelectric assembly are of a silver amalgam and said electrodes on the faces of said piezoelectric elements are of silver film.

References Cited by the Examiner

UNITED STATES PATENTS

| | | | |
|---|---|---|---|
| 489,077 | 1/93 | Harris | 75—169 |
| 2,293,485 | 8/42 | Baldwin | 310—9 |
| 2,379,420 | 7/45 | Forsgren | 75—169 |
| 2,511,624 | 6/50 | D'Halloy | 310—9 |
| 2,700,738 | 1/55 | Havens | 310—8.7 |
| 2,768,421 | 10/56 | Gravely | 29—25.35 |
| 2,850,382 | 9/58 | Kelly et al. | 75—169 |
| 2,861,320 | 11/58 | Gravely | 29—25.35 |
| 2,864,013 | 12/58 | Wood | 310—8.6 |
| 3,037,065 | 5/62 | Hockings et al. | 75—169 |

MILTON O. HIRSHFIELD, *Primary Examiner.*